United States Patent
Alkhatib et al.

(10) Patent No.: US 9,582,652 B2
(45) Date of Patent: *Feb. 28, 2017

(54) FEDERATION AMONG SERVICES FOR SUPPORTING VIRTUAL-NETWORK OVERLAYS

(71) Applicant: MICROSOFT CORPORATION, Redmond, WA (US)

(72) Inventors: Hasan Alkhatib, Kirkland, WA (US); Geoffrey Outhred, Seattle, WA (US); Deepak Bansal, Redmond, WA (US); Anatoliy Panasyuk, Bellevue, WA (US); Dharshan Rangegowda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/202,966

(22) Filed: Mar. 10, 2014

(65) Prior Publication Data

US 2014/0196121 A1 Jul. 10, 2014

Related U.S. Application Data

(63) Continuation of application No. 12/823,891, filed on Jun. 25, 2010, now Pat. No. 8,688,994.

(51) Int. Cl.
*H04L 9/32* (2006.01)
*G06F 21/31* (2013.01)
(Continued)

(52) U.S. Cl.
CPC ............ *G06F 21/31* (2013.01); *H04L 9/3234* (2013.01); *H04L 9/3247* (2013.01);
(Continued)

(58) Field of Classification Search
CPC .......... H04L 63/0272; H04L 29/12018; H04L 29/12207; H04L 29/12349; H04L 41/0803;
(Continued)

(56) References Cited

PUBLICATIONS

Palmieri (2007). Introducing Virtual Private Overlay Network Services in Large Scale Grid Infrastructures. Journal of Computers 2(2), 61-72.*

* cited by examiner

*Primary Examiner* — Brian Shaw
(74) *Attorney, Agent, or Firm* — Ben Tabor; Kate Drakos; Micky Minhas

(57) ABSTRACT

Computerized methods, systems, and computer-readable media for promoting cooperation between a first and second virtual network overlay ("overlay") are provided. The first overlay is governed by a first authority domain and includes members assigned virtual IP addresses from a first address range. The second overlay is governed by a second authority domain, which is associated with a second federation mechanism, for negotiating on behalf of the second overlay. The second federation mechanism is capable of negotiating with, or soliciting delegation of authority from, a first federation mechanism that is associated with the first authority domain. When negotiations are successful or authority is delegated, the second federation mechanism establishes a communication link between the second overlay and the first overlay or joins a member of the second overlay to the first overlay. Joining involves allocating a guest IP address from the first address range to the member.

19 Claims, 8 Drawing Sheets

(51) Int. Cl.
*H04L 29/12* (2006.01)
*H04L 29/06* (2006.01)

(52) U.S. Cl.
CPC .. *H04L 29/12264* (2013.01); *H04L 29/12452* (2013.01); *H04L 61/2046* (2013.01); *H04L 61/2546* (2013.01); *H04L 63/0815* (2013.01); *H04L 63/104* (2013.01); *H04L 2209/60* (2013.01)

(58) Field of Classification Search
CPC . H04L 61/20; H04L 61/2507; H04L 63/0815; H04L 63/104; H04L 29/12264; H04L 29/12452; H04L 2209/60; G06F 17/30067; G06F 9/45504; G06F 9/5077; G06F 21/31
USPC ......... 713/161, 176; 709/249, 223; 370/466, 370/390, 254, 395.53
See application file for complete search history.

FEDERATION AMONG SERVICES FOR SUPPORTING VIRTUAL-NETWORK OVERLAYS

CROSS-REFERENCE TO RELATED APPLICATIONS

This application is a continuation of, and claims priority from, U.S. patent application Ser. No. 12/823,891, filed Jun. 25, 2010, entitled "FEDERATION AMONG SERVICES FOR SUPPORTING VIRTUAL-NETWORK OVERLAY" which is incorporated herein by reference in its entirety.

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine running on a physical host. When the data center hosts multiple tenants (e.g., customer programs), these resources are optimally allocated from the same data center to the different tenants.

Presently, the implementation of connections between endpoints of remote networks is rooted in physical connectivity. Yet, there is an emerging trend toward virtualizing connectivity. In one instance, virtualizing connectivity involves creating an ad hoc association among endpoints in order for them to buffer applications from possible irregularities of the underlying physical networks. Such physical network irregularities may break down a connection between endpoints for certain applications.

By way of example, network address translation (NAT), which delivers data packets to a target endpoint carrying a source IP address that is not the actual identifier of the origination endpoint but a conversion fabricated by an intermediary mechanism, will impair two-way traffic between the target and origination endpoints for peer-to-peer applications. That is, using the supplemental technology to convert or translate data packets destroys knowledge of the originating endpoint, as well as the subnet relationship between the endpoints or the peer-to-peer semantics. This destruction of the peer-to-peer semantics may cause failures within certain service applications, such as video-conferencing software. Because it is problematic to complete transactions over networks in which the target endpoint must separately attain knowledge of the actual identifier of the origination endpoint, technology that establishes a robust communication link that is absent translation mechanisms would be advantageous.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide federation mechanisms for joining an endpoint within the purview of a second authority domain to a first virtual network overlay ("overlay") governed by a first authority domain. Other embodiments of the present invention are directed to establishing a communication link between the first overlay and a second overlay that is governed by the second authority domain.

As discussed below with greater detail, domain authorities may host various service applications simultaneously. Typically, isolation of the endpoints of the service applications is desirable for security purposes and can be achieved by establishing secure overlays. In one instance, the secure overlays set in place restrictions on who can communicate with the endpoints of the service applications. Further, the secure overlays preclude non-member endpoints of the other service applications from communicating with those endpoints instantiated within the secure overlays.

Initially, a second federation mechanism, which is associated with the second authority domain, is provided for negotiating on behalf of the second overlay and endpoint within the second authority domain. The second federation mechanism is also capable of negotiating with, or soliciting delegation of authority from, a first federation mechanism that is associated with the first authority domain. When negotiations are successful, or authority is delegated, the second federation mechanism establishes a communication link supporting peer-to-peer semantics between the second overlay and the first overlay. In this way, the virtualized endpoints (e.g., members of the first and second overlay) may be associated together in a group so that they mutually appear to one another that they are participants within a common dedicated network. Further, this manner of interfacing overlays simplifies provisioning security policies upon the members of the overlays and enforcing security policies on the connections between the members of the first and second overlay.

Or, upon successfully negotiating between federation mechanisms or delegating authority from one federation mechanism to another, the endpoints of the second authority domain may join the first overlay. Joining typically involves allocating a guest IP address from the first overlay's address range to the endpoint(s). Joining may also involve the first federation mechanism conveying to the endpoint(s) a security token that allows the first overlay to cryptographically verify the endpoint(s). Upon joining the first overlay, the endpoint(s) may interoperate with the members of the first overlay as if they were located within the same subnet.

As such, federation mechanisms enable interoperability between the first and second overlays that are supported by independent services (e.g., a first managing service of the first domain authority and a second managing service of the second domain authority). Once interoperability is established, the first and second overlays can be employed to restore peer-to-peer semantics among an ad hoc group of endpoints that belong to different network address realms. As a result, the interoperating overlays can also serve to provide a security realm boundary for which a set of security policies can be defined and enforced via end-to-end security mechanisms, such as internet protocol security (IPSec).

BRIEF DESCRIPTION OF THE DRAWINGS

Embodiments of the present invention are described in detail below with reference to the attached drawing figures, wherein.

DETAILED DESCRIPTION

Figure 1:
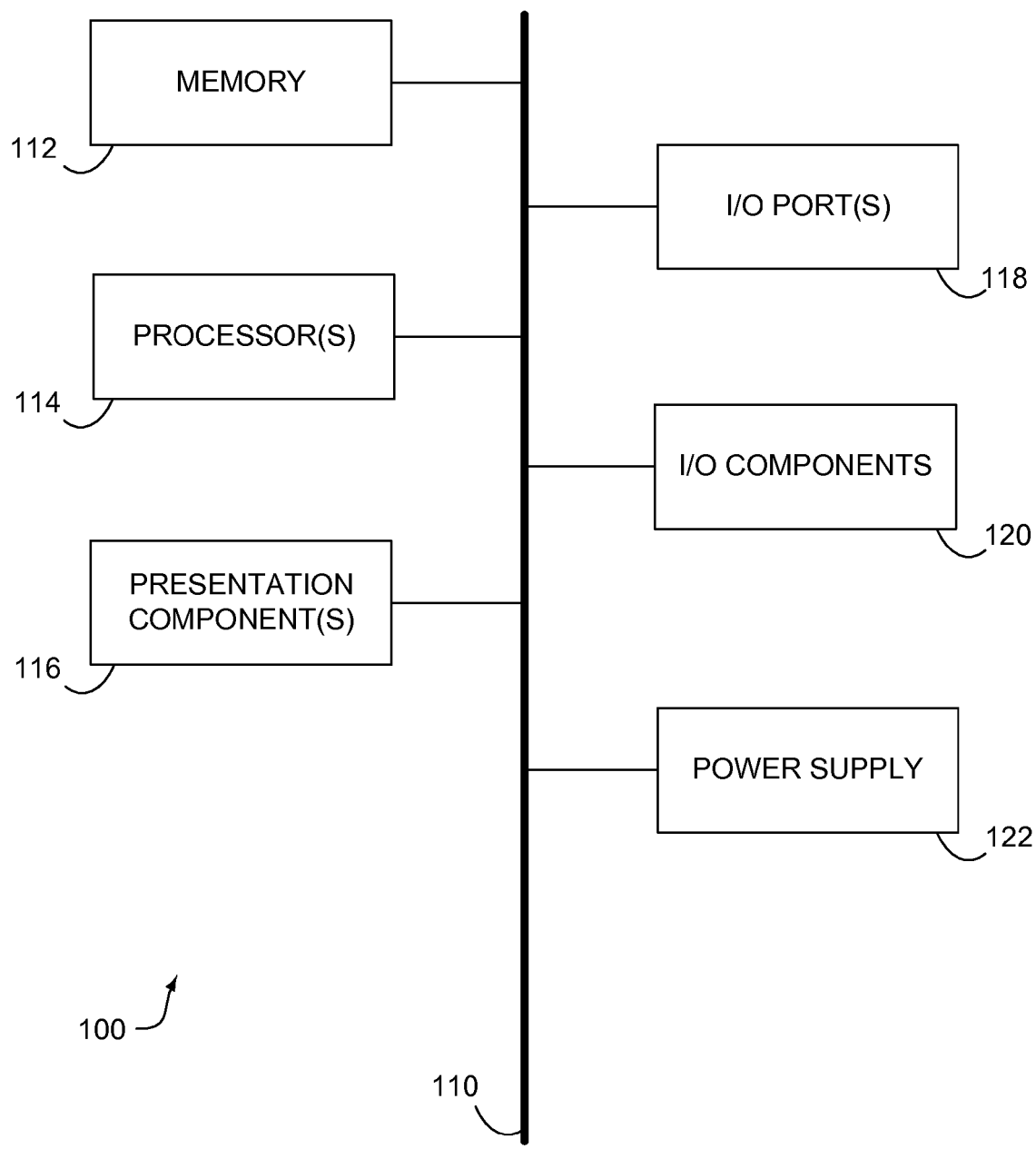
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for providing federation mechanisms that establish and manage secure communication links between virtual network overlays ("overlays"), and/or join an endpoint under the purview of one authority domain with an overlay governed by another authority domain. In one aspect, embodiments of the present invention relate to one or more computer-readable media having computer-executable instructions embodied thereon that, when executed, perform a method for allowing a first overlay governed by a first authority domain to negotiate with a second overlay governed by second authority domain in order to avoid addressing ambiguity. Initially, the method involves the steps of providing the first overlay that includes members assigned virtual IP addresses from a first address range, and providing the second overlay that includes members assigned virtual IP addresses from a second address range. Typically, a first federation mechanism is associated with the first authority domain and is provisioned to negotiate on behalf of the first overlay, and a second federation mechanism is associated with the second authority domain and is provisioned to negotiate on behalf of the second overlay.

The method may further comprise invoking a negotiation between the first federation mechanism and the second federation mechanism. In an exemplary embodiment, the negotiation involves an address-resolution process that includes one or more of the following steps: determining a version of internet protocol (IP) to employ when routing communications between the first overlay and the second overlay; when it is determined to employ IP version 6 (IPv6) addressing, establishing a communication link that is absent a translation mechanism; when it is determined to employ IP version 4 (IPv4) addressing, determining whether a portion of the first address range and a portion of the second address range overlap; when it is determined that no overlap exists between the first address range and the second address range, establishing the communication link that is absent a translation mechanism; and when it is determined that the first address range and the second address range overlap, establishing a network address translation (NAT) link that attempts to resolve IPv4 address conflicts between the first overlay and the second overlay.

In another aspect, embodiments of the present invention relate to a computer system capable of coordinating between a first authority domain and a second authority domain. Initially, the computer system includes the following software-based components: a subject member under the purview of the second authority domain; a first overlay governed by the first authority domain, a first federation mechanism that is associated with the first authority domain, and a second federation mechanism that is associated with the second authority domain. As discussed in more detail with respect to FIG. 5, the first overlay includes members assigned virtual IP addresses from a first address range.

In operation, the second federation mechanism sends a request that the subject member join the first overlay. Upon receiving the request, the first federation mechanism allocates a guest IP address from the first address range. In addition, the first federation mechanism sends a confirmation including the guest IP address to the second federation mechanism.

In yet another aspect, embodiments of the present invention relate to a computerized method for joining a subject endpoint under the purview of a second authority domain to a first overlay. The method involves a second federation mechanism negotiating with a first federation mechanism on behalf of the subject endpoint. In this particular embodiment, the negotiation results in a predetermination that the subject endpoint is authorized to join the first overlay. The second federation mechanism may at some later time request that the subject endpoint be admitted to the first overlay. Typically, the first overlay is governed by the first authority domain and includes members assigned virtual IP addresses from a first address range. The method further involves the steps of receiving a guest IP address from the first address range, and receiving a security token. In embodiments, the guest IP address in conjunction with the security token allow the subject endpoint to interoperate with members of the first overlay using peer-to-peer semantics. Upon joining the subject endpoint to the first overlay, a key that validates the security token is written to a storage location for eventual validation of the security token.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
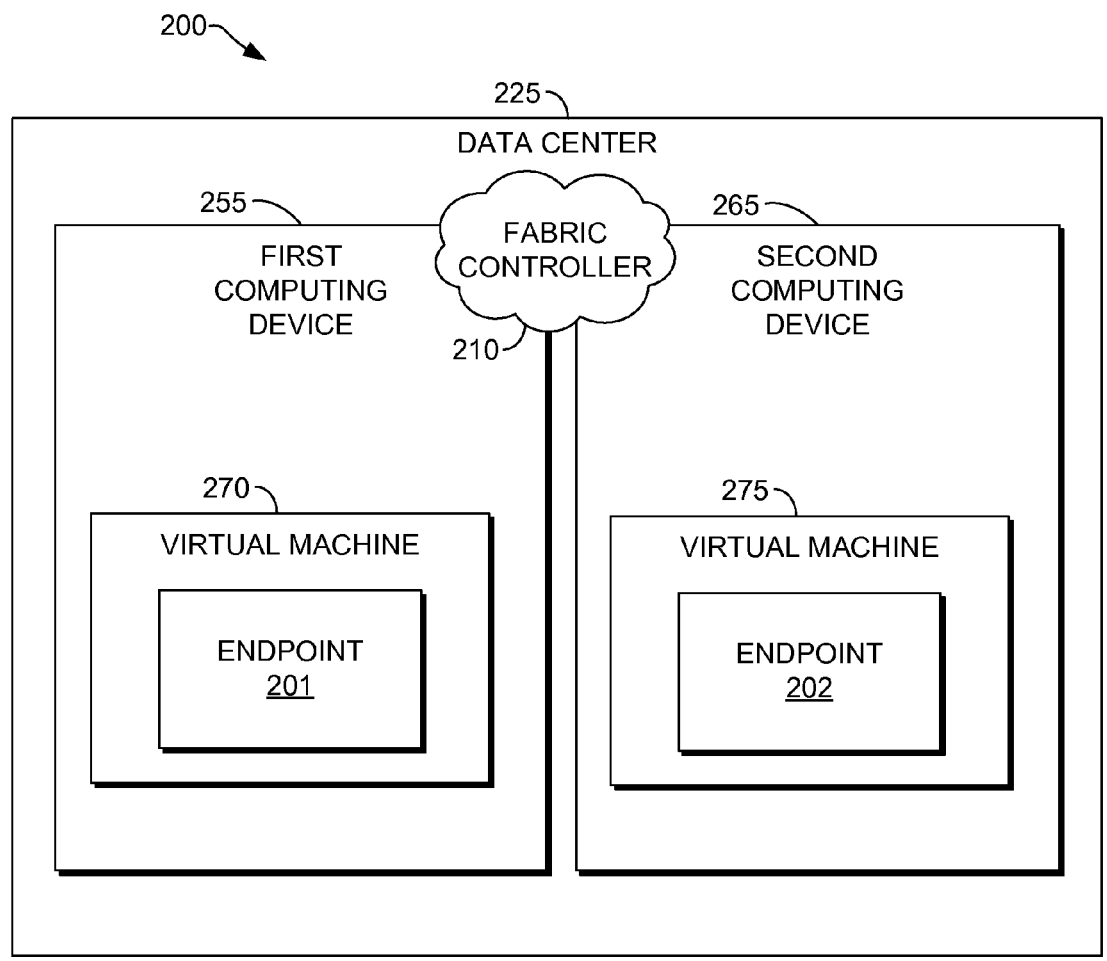
FIG. 2 is a block diagram illustrating an exemplary cloud computing platform, suitable for use in implementing embodiments of the present invention.

With reference to FIGS. 1 and 2, a first computing device 255 and/or second computing device 265 may be implemented by the exemplary computing device 100 of FIG. 1. Further, endpoint 201 and/or endpoint 202 may access portions of the memory 112 of FIG. 1 and/or consume an allocation of processing capability of the processors 114 of FIG. 1.

Turning to FIG. 2, a general discussion of propagated endpoints within a distributed data center will now commence. In particular, FIG. 2 illustrates a block diagram, in accordance with an embodiment of the present invention, showing an exemplary cloud computing platform 200 that is configured to allocate virtual machines 270 and 275 within a data center 225 for use by a service application. It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud computing platform 200 includes the data center 225 configured to host and support operation of endpoints 201 and 202 of a particular service application. The phrase "service application," as used herein, broadly refers to any software, or portions of software, that runs on top of, or accesses storage locations within, the data center 225. In one embodiment, one or more of the endpoints 201 and 202 may represent the portions of software, component programs, tenants, or instances of roles that perform a specific set of functions to support operation of the service application. In another embodiment, one or more of the endpoints 201 and 202 may represent stored data that is accessible to the service application. It will be understood and appreciated that the endpoints 201 and 202 shown in FIG. 2 are merely an example of suitable parts to support the service application and are not intended to suggest any limitation as to the scope of use or functionality of embodiments of the present invention.

Generally, virtual machines 270 and 275 are allocated to the endpoints 201 and 202 of the service application based on demands (e.g., amount of processing load) placed on the service application. As used herein, the phrase "virtual machine" is not meant to be limiting, and may refer to any software, application, operating system, or program that is executed by a processing unit to underlie the functionality of the endpoints 201 and 202. Further, the virtual machines 270 and 275 may include processing capacity, storage locations, and other assets within the data center 225 to properly support the endpoints 201 and 202.

In operation, the virtual machines 270 and 275 are dynamically allocated within resources (e.g., first computing device 255 and second computing device 265) of the data center 225, and endpoints (e.g., the endpoints 201 and 202)

are dynamically placed on the allocated virtual machines 270 and 275 to satisfy the current processing load. In one instance, a fabric controller 210 is responsible for automatically allocating the virtual machines 270 and 275 and for placing the endpoints 201 and 202 within the data center 225. By way of example, the fabric controller 210 may rely on a service model (e.g., designed by a customer that owns the service application) to provide guidance on how and when to allocate the virtual machines 270 and 275 and to place the endpoints 201 and 202 thereon.

As discussed above, the virtual machines 270 and 275 may be dynamically allocated within the first computing device 255 and second computing device 265. Per embodiments of the present invention, the computing devices 255 and 265 represent any form of computing devices, such as, for example, a nodes, a physical host, a personal computer, a desktop computer, a laptop computer, a mobile device, a consumer electronic device, server(s), the computing device 100 of FIG. 1, and the like. In one instance, the computing devices 255 and 265 host and support the operations of the virtual machines 270 and 275, while simultaneously hosting other virtual machines carved out for supporting other tenants of the data center 225, where the tenants include endpoints of other service applications owned by different customers.

In one aspect, the endpoints 201 and 202 operate within the context of the cloud computing platform 200 and, accordingly, communicate internally through connections dynamically made between the virtual machines 270 and 275, and externally through a physical network topology to resources of various remote networks. The internal connections may involve interconnecting the virtual machines 270 and 275, distributed across physical resources of the data center 225, via a network cloud (not shown). The network cloud interconnects these resources such that the endpoint 201 may recognize a location of the endpoint 202, and other endpoints, in order to establish a communication therebetween. In addition, the network cloud may establish this communication over channels connecting the endpoints 201 and 202 of the service application. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Figure 3:
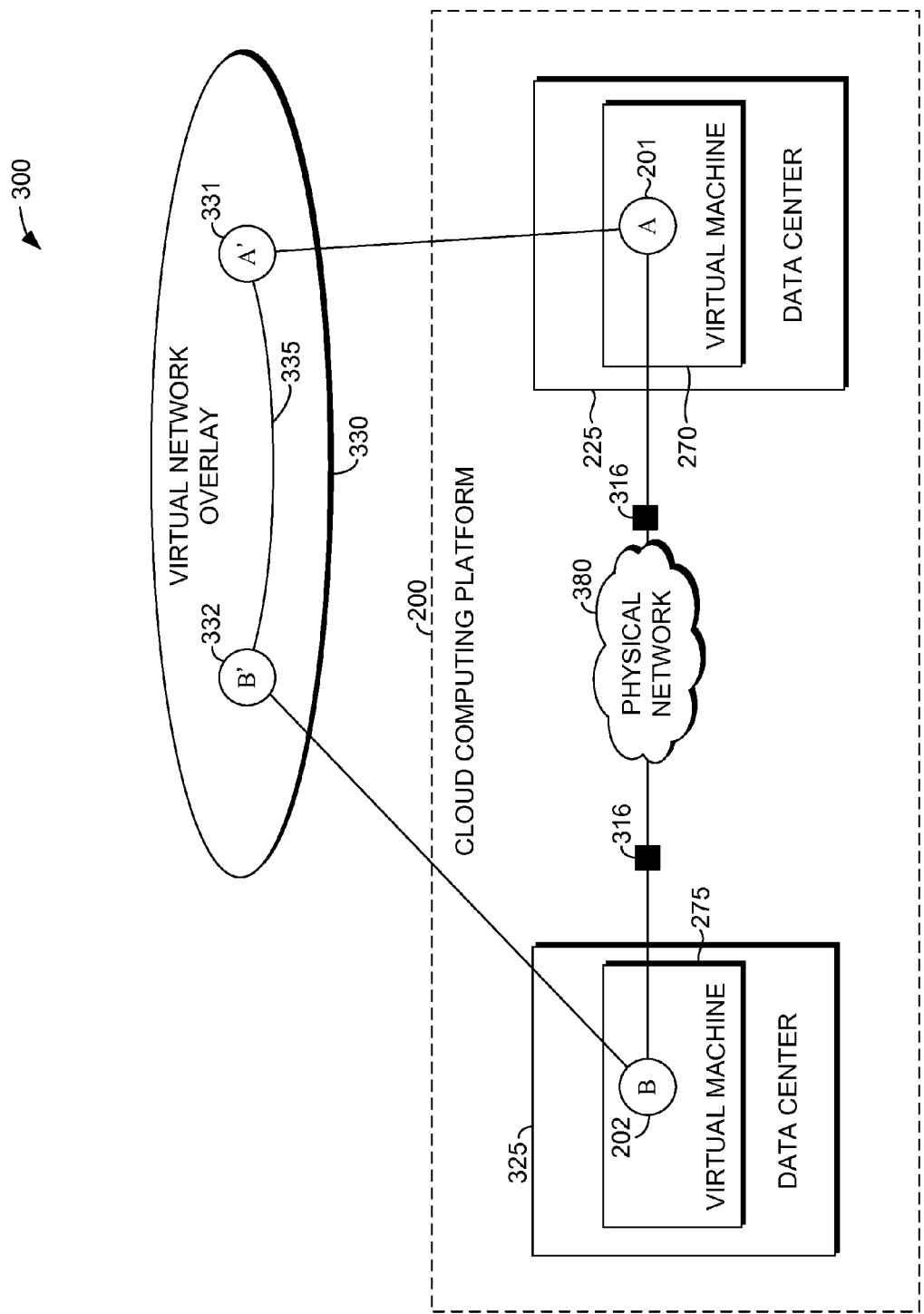
FIG. 3 is block diagram of an exemplary distributed computing environment with a virtual network overlay established therein, in accordance with an embodiment of the present invention.

The architecture and operation of an overlay, which provides virtualized connectivity between endpoints that are members thereof, will now be discussed. Turning to FIG. 3, block diagram illustrating an exemplary distributed computing environment 300, with a virtual network overlay 330 established therein, is shown in accordance with an embodiment of the present invention. Initially, the distributed computing environment 300 includes the cloud computing platform 200 (e.g., authority domains 612 and 614) that includes data centers 225 and 235 connected via a physical network 380. As used herein, the phrase "physical network" is not meant to be limiting, but may encompass tangible mechanisms and equipment (e.g., fiber lines, circuit boxes, switches, antennas, IP routers, and the like), as well as intangible communications and carrier waves, that facilitate communication between endpoints at geographically remote locations. By way of example, the physical network 380 may include any wired or wireless technology utilized within the Internet, or available for promoting communication between disparate networks.

Generally, the data centers 225 and 325 include resources and virtual machines, such as the virtual machines 270 and 275, that are managed by a fabric controller. Often, these resources host and virtual machines are allocated to host and support operations of components of the service application owned by the customer. The endpoints A 201 and B 202 represent component programs, or tenants, of one or more service applications. In an exemplary embodiment, the resources and the virtual machines 270 and 275 are allocated by fabric controllers within the data centers 225 and 325 to host and support operations of the endpoints A 201 and B 202 of a single service application distributed across the cloud computing platform 200. In operation, the endpoints A 201 and B 202 work in concert with each other to ensure the service application runs properly. In one instance, working in concert involves transmitting between the endpoints A 201 and B 202 data packets 316 across the physical network 380.

Typically, the data centers 325 and 225 include, or are linked to, some form of a computing unit (e.g., central processing unit, microprocessor, etc.) to support operations of the endpoint(s) and/or component(s) running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the data centers 325 and 225 to enable each machine (e.g., virtual machines 270 and 275 and physical hosts) therein to perform a variety of processes and operations. In another instance, the computing unit may encompass a processor (not shown) coupled to the computer-readable medium accommodated by each of the data centers 325 and 225. Generally, the computer-readable medium stores, at least temporarily, a plurality of computer software components (e.g., the endpoints A 201 and B 202) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

The virtual network overlay 330 ("overlay 330") is typically established for a single service application, such as the service application that includes the endpoints A 201 and B 202, in order to promote and secure communication between the endpoints of the service application. Generally, the overlay 330 represents a layer of virtual IP addresses, instead of physical IP addresses, that virtually represents the endpoints of the service applications and connects the virtual representations in a secured manner. In other embodiments, the overlay 330 is a virtual network built on top of the physical network 380 that includes the resources allocated to the customer controlling the service application. In operation, the overlay 330 maintains one or more logical associations of the interconnected end points A 201 and B 202 and enforces the access control/security associated with the end points A 201 and B 202 required to achieve physical network reachability (e.g., using a physical transport).

The establishment of the overlay 330 will now be discussed with reference to FIG. 3. Initially, the endpoint A 201 residing in the data center 225 of the cloud computing platform 200 is identified by as being a component of a particular service application. The endpoint A 201 may be reachable over the physical network 380 at a first physical IP address. When incorporated into the overlay 330, the endpoint A 201 is assigned a first virtual IP address that locates a virtual presence A' 331 of the endpoint A 201 within the overlay 330. The first physical IP address and the first virtual IP address may be bound and maintained within a map.

In addition, the endpoint B 202 residing in the data center 325 may be identified by as being a component of the particular service application. The endpoint B 202 may be reachable over the physical network 380 at a second physical IP address. When incorporated into the overlay 330, the endpoint B 202 is assigned a second virtual IP address that locates a virtual presence B' 332 of the endpoint B 202 within the overlay 330. The second physical IP address and the second virtual IP address may be bound and maintained within the map. As used herein, the term "map" is not meant to be limiting, but may comprise any mechanism for writing and/or persisting a value in association with another value. By way of example, the map may simply refer to a table that records address entries stored in association with other address entries. In one instance, the map may be maintained on and is accessible by the hosting name server. Alternatively, the map may be located in any computing device connected to or reachable by the physical network 380 and is not restricted to a single instance. In operation, the map is thus utilized to route the data packets 316 between the endpoints A 201 and B 202 based on communications exchanged between the virtual presences A' 331 and B' 332 within the overlay 330. By way of example, the map is utilized in the following manner: a communication to the endpoint A 201 across the overlay 330 is detected; upon detection, the map is accessed to translate a physical IP address from the virtual IP address that originated the communication; and providing a response to the communication by directing the response to the physical IP address.

In embodiments, the hosting name server is responsible for assigning the virtual IP addresses when instantiating the virtual presences A' 331 and B' 332 of the endpoints A 201 and B 202. The process of instantiating further includes assigning the overlay 330 a range of virtual IP addresses that enable functionality of the overlay 330. In an exemplary embodiment, the range of virtual IP addresses includes an address space that does not conflict or intersect with the address space of either of the data centers 225 and 235. In particular, the range of virtual IP addresses assigned to the overlay 330 does not include addresses that match the first and second physical IP addresses of the endpoints A 201 and B 202, respectively.

Upon selection of the virtual IP address range, the process of instantiating includes joining the endpoints A 201 and B 202 as members of a group of endpoints that are employed as components of the service application. Typically, all members of the group of endpoints may be identified as being associated with the service application within the map. In one instance, the endpoints A 201 and B 202 are joined as members of the group of endpoints upon the service application requesting additional components to support the operation thereof. In another instance, joining may involve inspecting a service model associated with the service application, allocating the virtual machine 270 within the data center 225 of the cloud computing platform 200 in accordance with the service model, and deploying the endpoint A 201 on the virtual machine 270. In embodiments, the service model governs which virtual machines within the data center 225 are allocated to support operations of the service application. Further, the service model may act as an interface blueprint that provides instructions for managing the endpoints of the service application that reside in the cloud computing platform 200.

Figure 4:
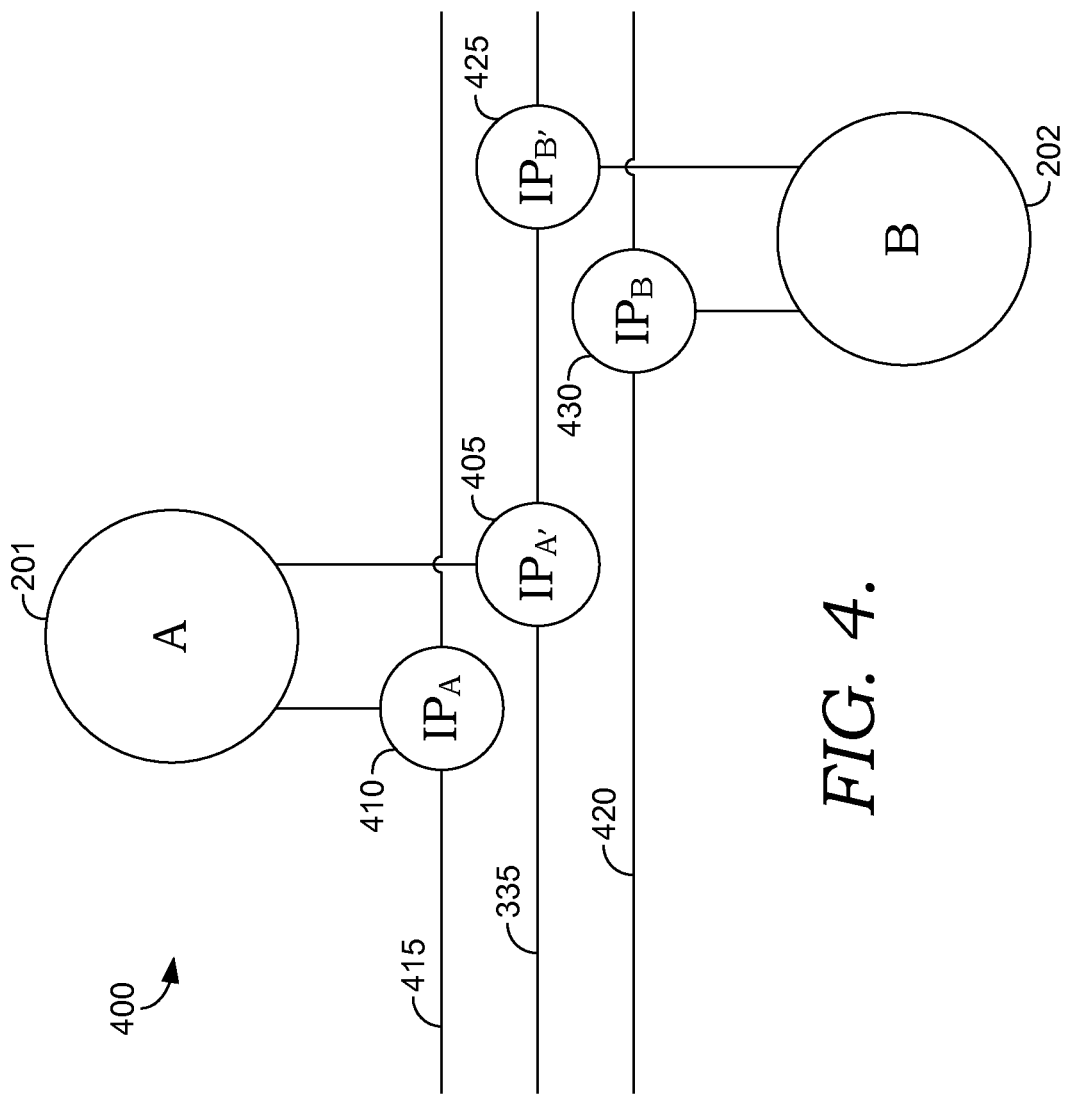
FIG. 4 is a schematic depiction of a secured connection within the virtual network overlay, in accordance with an embodiment of the present invention.

Once instantiated, the virtual presences A' 331 and B' 332 of the endpoints A 201 and B 202 may communicate over a secured connection 335 within the overlay 330. This secured connection 335 will now be discussed with reference to FIG. 4. As shown, FIG. 4 is a schematic depiction of the secured connection 335 within the overlay 330, in accordance with an embodiment of the present invention. Initially, endpoint A 201 is associated with a physical IP address $IP_A$ 410 and a virtual IP address $IP_A'$ 405 within the overlay 330 of FIG. 3. The physical IP address $IP_A$ 410 is reachable over a channel 415 within a topology of a physical network. In contrast, the virtual IP address $IP_A'$ 405 communicates across the secured connection 335 to a virtual IP address $IP_B'$ 425 associated with the endpoint B 385. Additionally, the endpoint B 202 is associated with a physical IP address $IP_B$ 430. The physical IP address $IP_B$ 430 is reachable over a channel 420 within the topology of the physical network.

In operation, the overlay 330 enables complete connectivity between the endpoints A 201 and B 202 via the secured connection 335 from the virtual IP address $IP_A'$ 405 to the virtual IP address $IP_B'$ 425. In embodiments, "complete connectivity" generally refers to representing endpoints and other resources, and allowing them to communicate, as if they are on a single network, even when the endpoints and other resources may be geographically distributed and may reside in separate private networks.

Further, the overlay 330 enables complete connectivity between the endpoints A 201, B 202, and other members of the group of endpoints associated with the service application. By way of example, the complete connectivity allows the endpoints of the group to interact in a peer-to-peer relationship, as if granted their own dedicated physical network carved out of a data center. As such, the secured connection 335 provides seamless IP-level connectivity for the group of endpoints of the service application when distributed across different networks, where the endpoints in the group appear to each other to be connected in an IP subnet. In this way, no modifications to legacy, IP-based service applications are necessary to enable these service applications to communicate over different networks.

In addition, the overlay 330 serves as an ad-hoc boundary around a group of endpoints that are members of the service application. For instance, the overlay 330 creates secured connections between the virtual IP addresses of the group of endpoints, such as the secured connection 335 between the virtual IP address $IP_A'$ 405 and the virtual IP address $IP_B'$ 425. These secured connections are enforced by the map and ensure the endpoints of the group are unreachable by others in the physical network unless provisioned as a member. By way of example, securing the connections between the virtual IP addresses of the group includes authenticating endpoints upon sending or receiving communications across the overlay 330. Authenticating, by checking a physical IP address or other indicia of the endpoints, ensures that only those endpoints that are pre-authorized as part of the service application can send or receive communications on the overlay 330. If an endpoint that is attempting to send or receive a communication across the overlay 330 is not pre-authorized to do so, the non-authorized endpoint will be unreachable by those endpoints in the group.

Figure 5:
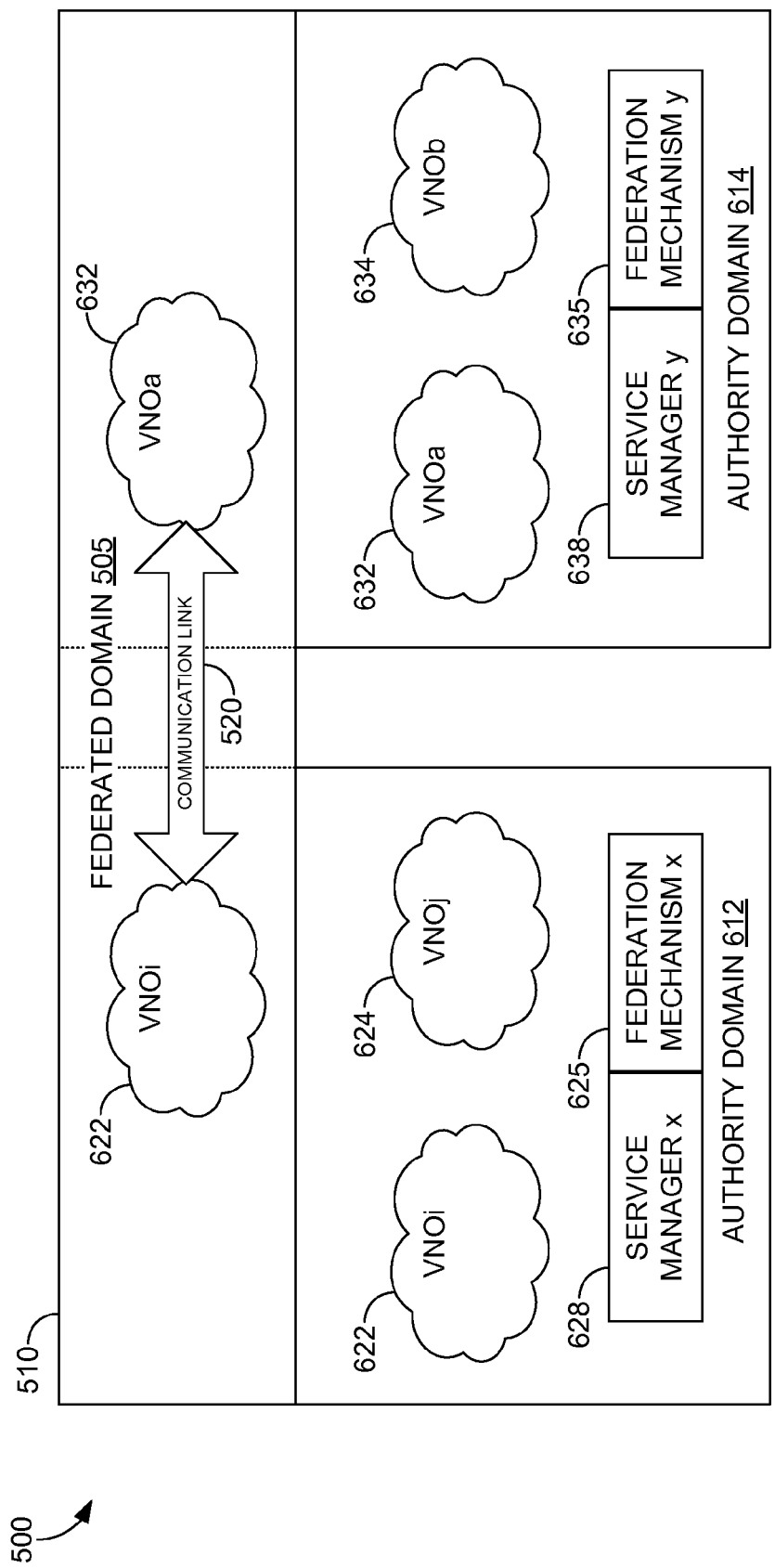
FIGS. 5 and 6 are block diagrams of exemplary distributed computing environments with virtual network overlays established therein, in accordance with embodiments of the present invention.
Figure 6:
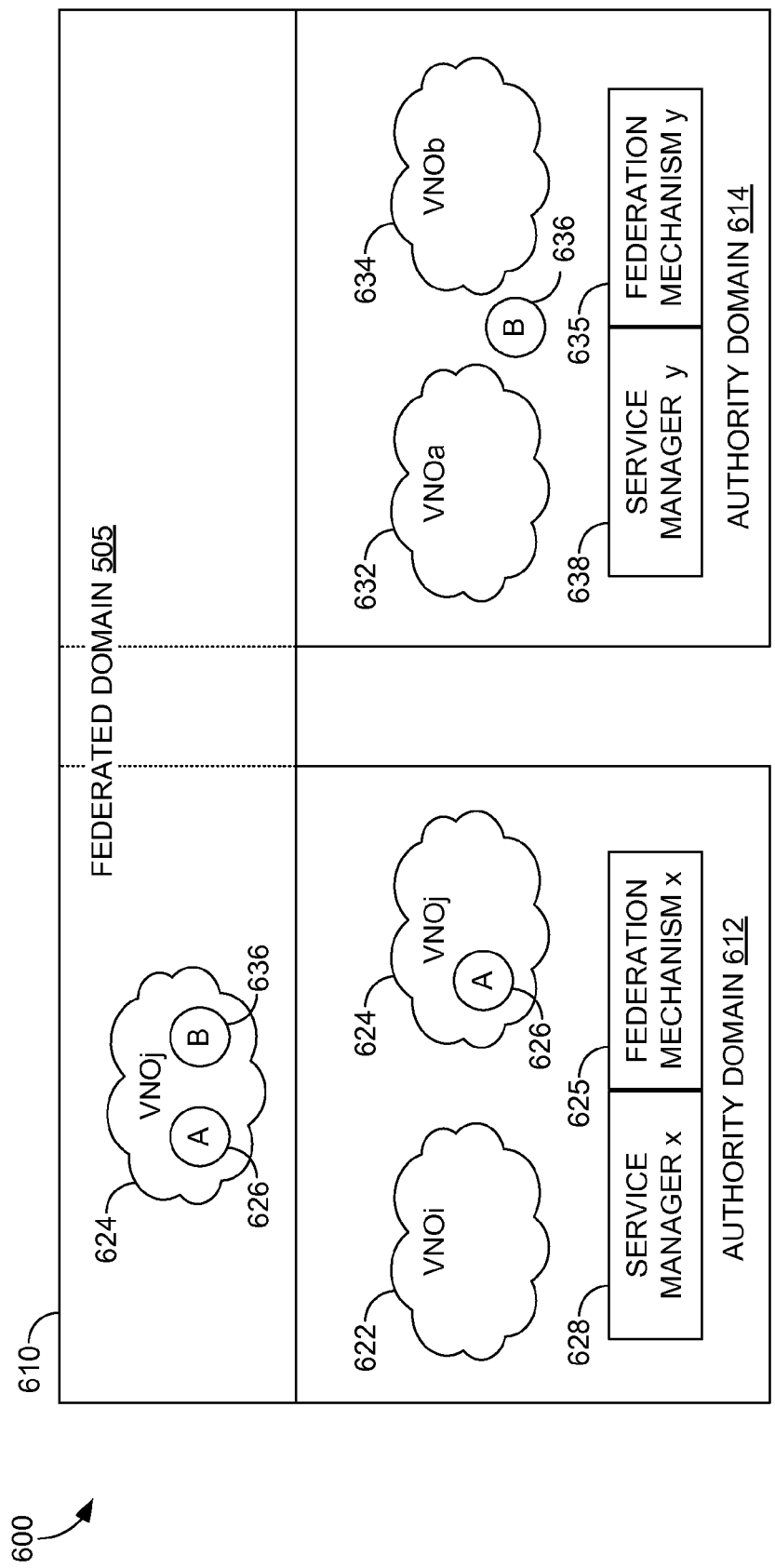

Turning to FIGS. 5 and 6, the employment of federation mechanisms, such as federation mechanisms x 625 and y 635, will now be discussed. As used herein, the phrase "federation mechanism" generally refers to technology for aligning two or more naturally independent services and for promoting interoperability among virtual network overlays, and members thereof, that are supported by independent services. Further, according to embodiments of the present invention, the federation mechanisms x 625 and y 635 are generally adapted for supporting the creation of rights and interoperation of virtual network /overlays (VNOs), such as VNOi 622, VNOj 624, VNOa 632, and VNOb 634. Further yet, the federation mechanisms x 625 and y 635 are employed to exchange trust on behalf of their members and endpoints, such as endpoints A 626 and B 636, for the purpose of interoperation among overlays and across authority domains. Even further, the federation mechanisms x 625 and y 635 are able to communicate with each other to negotiate a relationship model or delegate authority that regulates policy provisioning and policy enforcement when overlays are provisioned to interoperate with each other. As discussed below, interoperation may be implemented via a logical link (e.g., communication link 520) using peer-to-peer semantics or by allowing endpoints to join another overlay that is supported by an independent service, without requiring those members to be part of the other service. Generally, "peer-to-peer semantics" refers to making the endpoints and members of the overlays appear to one another is if they were adjacently located within the physical network, or within the same subnet.

Referring now to FIGS. 5, a block diagram of an exemplary distributed computing environment 500 with the overlays VNOi 622, VNOj 624, VNOa 632, and VNOb 634 established therein is shown, in accordance with embodiments of the present invention. Initially, the overlays VNOi 622, VNOj 624, VNOa 632, and VNOb 634 are comparable in structure and operation to the overlay 330 of FIG. 3. By way of example, overlay VNOi 622 may reside in a cloud computing network, while overlay VNOa 632 may reside in a private enterprise network. Or, in another example, overlays VNOi 622 and VNOa 632 may reside within separate networks of the same company, of individual but merged companies, or of partnered companies with remote processing locations.

As illustrated, the overlays VNOi 622 and VNOj 624 are governed by the service manager x 628 of the authority domain 612, while the overlays VNOa 632 and VNOb 634 are governed by the service manager y 638 of the authority domain 614. Accordingly, as shown in FIG. 5, some of the overlays VNOi 622, VNOj 624, VNOa 632, and VNOb 634 reside in separate domains governed by distinct authorities.

The authority domains 612 and 614 host and govern the overlays VNOi 622, VNOj 624, VNOa 632, and VNOb 634. Each of the authority domains 612 and 614 are associated with the service managers x 628 and y 638, respectively. These service managers x 628 and y 638 represent mechanisms responsible for managing various internal aspects within their respective authority domains 612 and 614, such as instantiation and management of overlays and endpoints. As illustrated in FIGS. 5 and 6, each of the service managers x 628 and y 638 include, or are operably coupled to, the federation mechanisms x 625 and y 635 that generally manage external aspects of their respective services. In one instance, the federation mechanisms x 625 and y 635 are responsible for the functions of promoting coordination between the authority domains 612 and 614, and facilitating interaction between the members/endpoints of the overlays VNOi 622, VNOj 624, VNOa 632, and VNOb 634.

In an exemplary embodiment, the federation mechanisms x 625 and y 635 are configured to coordinate IP addressing between the overlays VNOi 622 and VNOj 624 of authority domain 612 and overlays VNOa 632 and VNOb 634 of authority domain 614 via an address resolution process. In effect, the address resolution process helps avoid addressing ambiguity at the IP level, which may result from address overlaps between overlays, such as the overlays VNOi 622 and VNOa 632 depicted within authority domains 612 and 614, respectively.

Initially, as illustrated, the overlay VNOi 622 includes members that are assigned virtual IP addresses from a first address range. Further, the federation mechanism x 625 is provisioned to negotiate on behalf of the overlay VNOi 622. Generally, the overlay VNOi 622 represents a virtual network overlay that has a plurality of members joined thereto. These members of overlay VNOi 622 and a plurality endpoints of a service application that interact via peer-to-peer semantics. Similarly, the overlay VNOa 632 includes members that are assigned virtual IP addresses from a second address range, where the federation mechanism y 635 is provisioned to negotiate on behalf of the overlay VNOa 632. Generally, the overlay VNOa 632 represents a virtual network overlay that has a plurality of members joined thereto. These members of overlay VNOa 632 include a plurality of endpoints of a service application that interact via peer-to-peer semantics.

When setting up communication between the distributed overlays VNOa 632 and VNOi 622, the federation mechanism y 635 may, in one embodiment, invoke a negotiation between itself and the federation mechanism x 625. Typically, the negotiation includes an address-resolution process that establishes a relationship model that can be accessed and relied upon throughout the relationship between the overlays VNOa 632 and VNOi 622 and/or the relationship between the federation mechanisms x 625 and y 635. Generally, the relationship model is agreed on by the services overseeing the networks. The agreement may occur during a pre-negotiation process that completes prior to forming peer-to-peer relationships or establishing the communication link 520. Typically, the federation mechanisms x 625 and y 635 reference the relationship model when including and excluding endpoint into overlays, and overlays into other services.

In embodiments, the address-resolution process involves determining a version of IP to employ when routing communications between the overlays VNOa 632 and VNOi 622. If it is determined that both the service managers x 628 and y 638 use unique IPv6 addressing in each of the overlays VNOa 632 and VNOi 622, IP address overlap is ameliorated. As such, no additional steps are necessary to avoid addressing conflicts. Then, one or more of the federation mechanisms x 625 and y 635 establish the communication link 520, which is absent a translation mechanism, that serves as a route for allowing traffic to flow between overlays VNOa 632 and VNOi 622 by addressing data packets with unique IPv6 addresses. As shown, upon establishing the communication link 520, the overlays VNOi 622 and VNOa 632 are encompassed within a federated domain 505. In embodiments, the federated domain 505 represents a collection of joined overlays and/or endpoints that operate in concert as a single subnet, where the subnet is regulated by rules and policies managed and enforced by a service manager that is assigned (e.g., via delegation or negotiation) to govern the joined overlays and/or endpoints of the federated domain 505.

When it is determined that the service managers x 628 and y 638 use IPv4 addressing, a determination whether a portion of the first address range and a portion of the second address range overlap is performed. When it is determined that the first address range and the second address range overlap (e.g., the two service managers x 628 and y 638 are using overlapping IPv4 addresses), then the federation mechanisms x 625 and y 635 request from the service manager y 638 the range of address for VNOa 632. Also, the federation mechanisms x 625 and y 635 may establish a NAT link that attempts to resolve IPv4 address conflicts between the overlays VNOa 632 and VNOi 622. In one instance, the NAT link is formed by injecting a virtual device, which performs network address translation, on the communication link 520 either at overlay VNOa 632 or at overlay VNOi 622. In operation, the injected device will perform network address translation among members of the overlays VNOa 632 and VNOi 622, hence peer to peer semantics may be broken.

By way of clarification, the NAT link is an element that provides an interface for networks that do not share the same address realm. Accordingly, the NAT link may accept a source IP address within data packets from an origination endpoint and convert source IP address into a unique identifier within the address range of the receiving network. However, hhen NAT is introduced to a link, as in this case, the peer-to-peer semantics are broken. As such, communication between the two endpoints over the NAT link may restrict the range of supported applications to only NAT-friendly applications When it is determined that no overlap exists (no conflict) between the first address range and the second address range, one or more of the federation mechanisms x 625 and y 635 establish the communication link 520 that is absent a translation mechanism. In particular, the communication link 520 is established as an IP route between overlays VNOa 632 and VNOi 622. Further, the communication link 520 helps to achieve peer-to-peer IP level semantics among members of the two overlays VNOa 632 and VNOi 622, whether they are individual members, or entire virtual network overlays. For instance, when data packets are sent from an origination endpoint within the overlay VNOa 632 over the communication link 520, the data packets may be structured with headers that carry a source IP address in virtual space that point to the origination endpoint. Upon the data packets traversing the communication link 520 and reaching a target endpoint within the overlay VNOi 622, no will have been translation applied to the headers.

Upon establishing the communication link 520, the federation mechanism y 635 may delegate authority over the policy that governs connectivity between two overlays VNOa 632 and VNOi 622, via the communication link 520, to the service manager x 628. In one embodiment, upon establishing the communication link 520, the process of delegating authority over the connectivity policy controlling the communication link 520 may involve the federation mechanism x 625 sending a solicitation, or submitting a request, to gain delegation of authority over the connectivity policy to the federation mechanism y 635. If the federation mechanism y 635 confirms and agrees to delegate authority to the federation mechanism x 625, the federation mechanism y 635 may communicate a confirmation to the federation mechanism x 625 agreeing to delegate authority of the connectivity policy thereto.

Upon the federation mechanism x 625 accepting the delegated authority over the connectivity policy, the federation mechanism 625 may relinquish the delegated authority to the service manager x 628. The service manager x 628 may, in turn, pass down the delegated authority to an administrator that manages overlay VNOi 632, where the administrator has the authority to provision the connectivity policy that governs the communication link 520. As such, this single administrator may enforce the rules of the connectivity policy that govern security and delivery across communication link 520.

In another embodiment, the federation mechanisms x 625 and y 635 may negotiate a grant of authority over policies controlling aspects of the communication link 520. Initially, upon establishing the communication link 520, the federation mechanism x 625 may offer a request to be granted authority over the communication link 520 from the federation mechanism y 635. In one instance, this solicitation may involve the federation mechanism x 625 sending a request that conveys a proposed policy to the federation mechanism y 635, wherein the request. As such, the federation mechanism x 625 may propose a policy that the federation mechanism y 635 may accept in entirety, or accept in part and suggest addendums to incorporate within the proposed policy.

If the response to the proposed policy from the federation mechanism y 635 is a reply that includes suggested addendums, the suggested addendums may then be accepted or declined by federation mechanism x 625. If the federation mechanism x 625 replies with an acceptance of the addendums, the federation mechanism y 635 henceforth confirms delegating authority to federation mechanism x 625. Typically, as discussed above, the federation mechanism x 625 authorizes the administrator of overlay VNOi 622 to provision the rules (e.g., proposed policy with addendums) that govern connectivity across the communication link 520. If, on the other hand, the response to the proposed policy from the federation mechanism y 635 is a reply that includes acceptance to the proposed policy in entirety, the federation mechanism x 625 may immediately be transferred the authority from the federation mechanism y 635 to provision and enforce the policy as originally proposed.

Referring now to an exemplary distributed computing environment 600 of FIG. 6, a process for joining an endpoint of one authority domain to an overlay of another authority domain will now be discussed. If endpoint B 636, which is under the purview and authority of service manager y 638, wants to become part of the overlay VNOj 624 that is under the authority of service manager x 628, then the federation mechanism x 625 and y 635 may negotiate policy or delegate authority to achieve the desired admittance of endpoint B 636 to VNOj 624. If endpoint B 636, in fact, joins the overlay VNOj 624, it can communicate with other members of overlay VNOj 624, such as endpoint A 626. Further, endpoints A 626 and B 636 may become peers and can, in concert, carry out service applications (e.g., streaming video conferencing) that are susceptible to breaking if traditional network translation is used to facilitate communication therebetween. It should be noted that endpoints A 626 and B 636 may be configured to interoperate as peers via one or more processes, as described below, even though the underlying physical network may still perform numerous network translations at many points.

In an exemplary embodiment, the endpoint B 636 may join the overlay VNOj 624 by carrying out a process where federation mechanism y 635 negotiates on behalf of the endpoint B 636 with the federation mechanism x 625. If the negotiations proves successful, federation mechanism y 635 obtain an address for the endpoint B 636 allowing the endpoint B 636 to join overlay VNOj 624 as a guest of the authority domain 612 under service manager x 628's authority. The process of negotiation may initially involve the federation mechanism y 635 informing the federation mechanism x 625 its intent for endpoint B 636 to join VNOj 624. In embodiments, the federation mechanism x 625 returns confirmation to federation mechanism y 635 if the federation mechanism x 625 has determined it is acceptable for the endpoint B 636 to join the overlay VNOj 624. Upon accepting the endpoint B 636, the federation mechanism x 625 may provide the federation mechanism y 635 a unique IP address, or guest IP address, allocated from within the range assigned to overlay VNOj 624 (i.e., the federation mechanism x 625 has authority to allocate from a range of address to the endpoint B 636). The guest IP address may then be assigned to the endpoint B 636 for communication with the overlay VNOj 624. Further, the endpoint B 636 may launch a virtual network interface controller (NIC) provisioned with the guest IP address and register as a guest with the overlay VNOj 624, thereby allowing the endpoint B 636 to interoperate with the members of the overlay VNOj 624 via peer-to-peer semantics. As such, the endpoint B 636 henceforth participates in the federated domain 505 via the virtual NIC and interacts with other members of the overlay VNOj 624 as if residing in the authority domain 612.

In other embodiments, trust of an endpoint may by delegated among independent virtual network services. Initially, the endpoint A 626 is under the purview of the authority domain 612 and its identity is cryptographically verifiable thereby. Similarly, the endpoint B 636 has an identity that is verifiable in the authority domain 614. In the operation of delegating trust, there occurs a set of communications between the federation mechanisms x 625 and y 635. Within the set of communications, the federation mechanism y 635 communicates its trust for the endpoint B 636 to federation mechanism x 625 to a level that the federation mechanism x 625 imparts trust to the endpoint B 636 as well. In one instance, the federation mechanism x 625 imparts trust to the endpoint B 636 based on a verification of the identity of the endpoint B 636 by the federation mechanism y 635.

In a particular method for delegating trust, the federation mechanism y 635 may attempt to delegate its trust of the endpoint B 636 to federation mechanism x 625 such that the federation mechanism x 625 allows the endpoint B 636 to join the overlay VNOj 624 and communicate with its trusted members thereof. By way of example, delegation of trust may involve claims-based federation that is extended to networking, where the federation mechanism y 635 provides the verification for the endpoint B 636's identity. In this example, the endpoint B 636 obtains a security token from federation mechanism y 635, which is also signed by federation mechanism y 635, in order for the endpoint B 636 to join the overlay VNOj 624 as a guest.

In an exemplary embodiment, the security token includes a claim that the endpoint B 636 is an authorized member within the authority domain 614 and that the endpoint B 636 can join the overlay services of authority domain 612. When federation mechanism x 625 receives the security token, it looks up the signature of federation mechanism y 635, and upon determining the signature is verified, the federation mechanism x 625 trusts the claim of the security token being presented thereto. In one instance, the signature of federation mechanism y 635 is verified by the federation mechanism x 625 by communicating the public key to the federation mechanism x 625 such that the federation mechanism x 625 applies the public key to the signature in order to validate (e.g., cryptographically verify) that the signature is authentic. Upon validation, the federation mechanism x 625 allows the endpoint B 636 to become a guest member in overlay the overlay VNOj 624.

Figure 7:
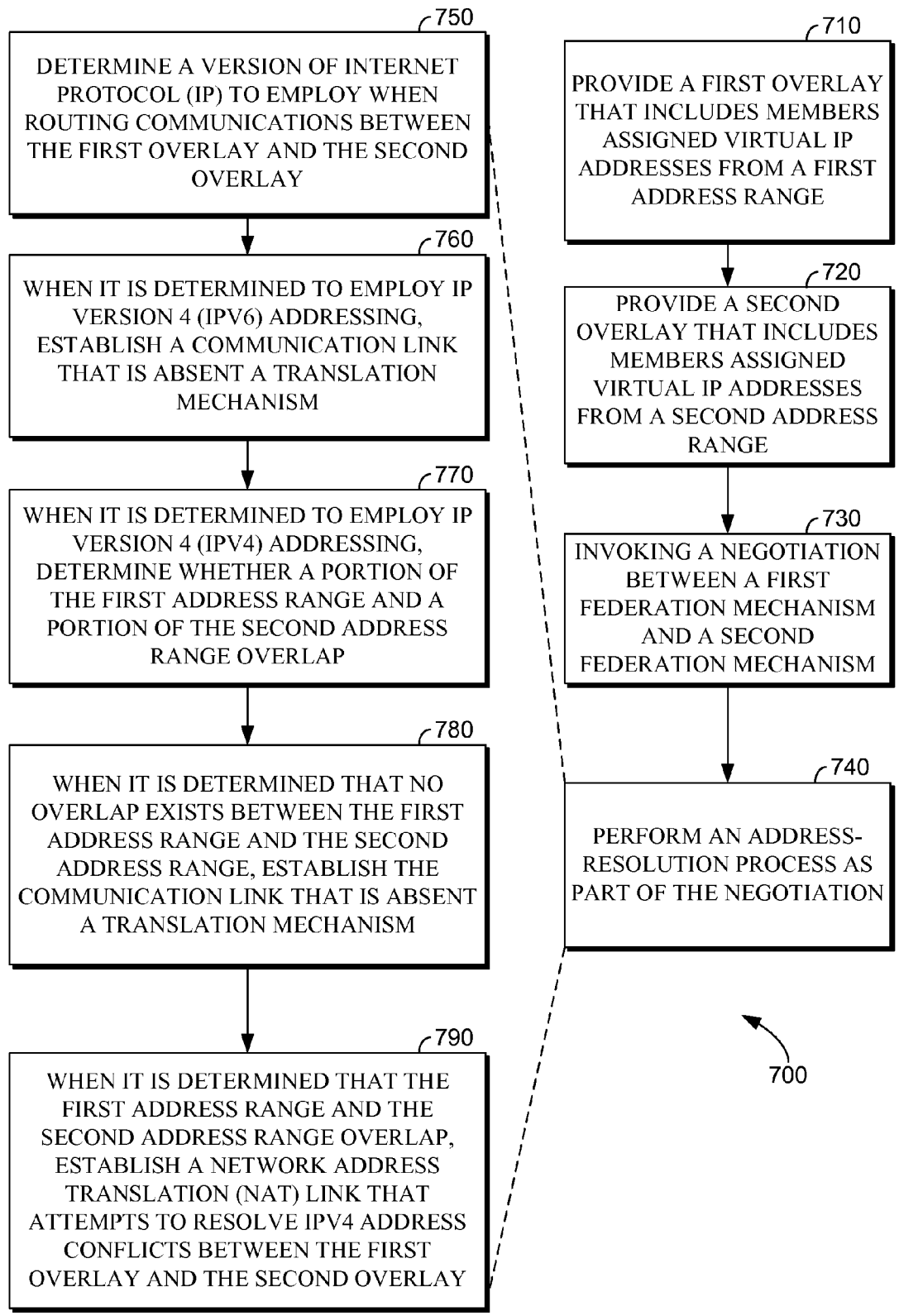
FIG. 7 is a flow diagram showing a method for allowing a first overlay governed by a first authority domain to negotiate with a second overlay governed by second authority domain in order to avoid addressing ambiguity, in accordance with an embodiment of the present invention.

Turning now to FIG. 7, a flow diagram is illustrated that shows a method 700 for allowing a first overlay governed by a first authority domain to negotiate with a second overlay governed by second authority domain in order to avoid addressing ambiguity, in accordance with an embodiment of the present invention. Initially, the method 700 involves the steps of providing the first overlay that includes members assigned virtual IP addresses from a first address range (see block 710), and providing the second overlay that includes members assigned virtual IP addresses from a second address range (see block 720). Typically, a first federation mechanism is associated with the first authority domain and is provisioned to negotiate on behalf of the first overlay, and a second federation mechanism is associated with the second authority domain and is provisioned to negotiate on behalf of the second overlay.

The method 700 may further comprise invoking a negotiation between the first federation mechanism and the second federation mechanism, as depicted at block 730. In an exemplary embodiment, as depicted at block 740, the negotiation involves an address-resolution process that includes one or more of the following steps: determining a version of IP to employ when routing communications between the first overlay and the second overlay (see block 750); when it is determined to employ IPv6 addressing, establishing a communication link that is absent a translation mechanism (see block 760); when it is determined to employ IPv4 addressing, determining whether a portion of the first address range and a portion of the second address range overlap (see block 770); when it is determined that no overlap exists between the first address range and the second address range, establishing the communication link that is absent a translation mechanism (see block 780); and when it is determined that the first address range and the second address range overlap, establishing a NAT link that attempts to resolve IPv4 address conflicts between the first overlay and the second overlay (see block 790).

Figure 8:
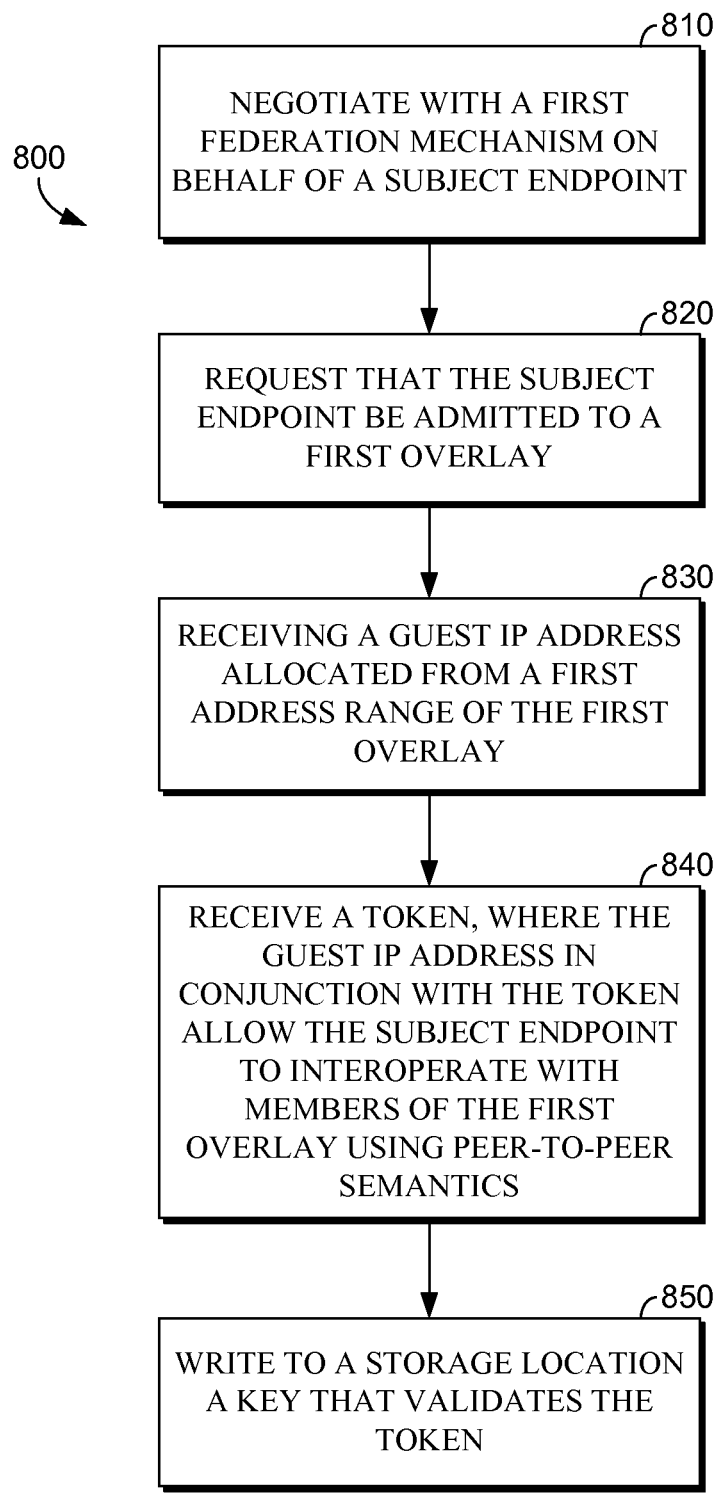
FIG. 8 is a flow diagram showing a method for joining a subject endpoint under the purview of a second domain authority to a first overlay governed by a first domain authority, in accordance with an embodiment of the present invention.

With reference to FIG. 8, a flow diagram is illustrated that shows a method 800 for joining a subject endpoint under the purview of a second domain authority to a first overlay governed by a first domain authority, in accordance with an embodiment of the present invention. The method 800 involves a second federation mechanism negotiating with a first federation mechanism on behalf of the subject endpoint, as depicted at block 810. In this particular embodiment, the negotiation results in a predetermination that the subject endpoint is authorized to join the first overlay. As depicted at block 820, the second federation mechanism may at some later time request that the subject endpoint be admitted to the first overlay. Typically, the first overlay includes members assigned virtual IP addresses from a first address range. The method 800 further involves the steps of receiving a guest IP address from the first address range (see block 830), and receiving a security token (see block 840). In embodiments, the guest IP address in conjunction with the security token allow the subject endpoint to interoperate with members of the first overlay using peer-to-peer semantics. Upon joining the subject endpoint to the first overlay, a key that validates the security token is written to a storage location for eventual validation of the security token, as depicted at block 850.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer-implemented method suitable for use on one or more computing devices having a processor and a memory to perform a method for allowing a first overlay governed by a first authority domain to negotiate with a second overlay governed by a second authority domain in order to avoid addressing ambiguity, the method comprising:

providing the first overlay that includes members assigned virtual IP addresses from a first address range, wherein a first federation mechanism is associated with the first authority domain and is provisioned to negotiate on behalf of the first overlay;

providing the second overlay that includes members assigned virtual IP addresses from a second address range, wherein a second federation mechanism is associated with the second authority domain and is provisioned to negotiate on behalf of the second overlay;

invoking a negotiation between the first federation mechanism and the second federation mechanism, wherein the negotiation includes an address-resolution process that establishes a communication link;

negotiating to gain authority over the communication link;

delegating authority over the communication link from the second federation mechanism to the first federation mechanism, wherein delegating authority over the communication link comprises the second federation mechanism delegating authority that governs policy provision and policy enforcement over the communication link to a service manager of the first federation mechanism; and when the first overlay and the second overlay are provisioned to interoperate, the service manager governs both the first federation mechanism of the first overlay and the second federation mechanism of the second overlay.

2. The computer-implemented method of claim 1, wherein the first overlay represents a virtual network overlay within a cloud computing network that has a plurality of members joined thereto, and wherein the plurality of members include endpoints of a service application that interact via peer-to-peer semantics.

3. The computer-implemented method of claim 1, wherein the second overlay represents a virtual network overlay within a private enterprise network that has a plurality of members joined thereto, and wherein the plurality of members include endpoints of a service application that interact via peer-to-peer semantics.

4. The computer-implemented method of claim 1, wherein the communication link enables direct communication via peer-to-peer semantics between members of the first overlay and members of the second overlay without relying on a translation mechanism.

5. The computer-implemented method of claim 1, wherein data packets sent from an origination endpoint of the first overlay are structured with headers that carry a source IP address in virtual space that point to a target endpoint, and wherein the data packets reach the target endpoint of the second overlay without translation applied.

6. The computer-implemented method of claim 5, wherein data packets returned from the target endpoint of the second overlay are structured with headers that carry a destination IP address in virtual space that point to the original endpoint, and wherein the data packets reach the origination endpoint of the first overlay without translation applied.

7. The computer-implemented method of claim 1, wherein the address negotiation process comprises:

(a) determining a version of internet protocol (IP) to employ when routing communications between the first overlay and the second overlay;

(b) when it is determined to employ IP version 6 (IPv6) addressing, establishing a communication link that is absent a translation mechanism;

(c) when it is determined to employ IP version 4 (IPv4) addressing, determining whether a portion of the first address range and a portion of the second address range overlap;

(d) when it is determined that no overlap exists between the first address range and the second address range, establishing the communication link that is absent the translation mechanism; and (e) when it is determined that the first address range and the second address range overlap, establishing a network address translation (NAT) link that attempts to resolve IPv4 address conflicts between the first overlay and the second overlay.

8. The computer-implemented method of claim 7, wherein establishing the NAT link comprises:

establishing the communication link between the first overlay and the second overlay; and injecting a translation device into the communication link that functions as an interface for converting overlapping IP addresses.

9. The computer-implemented method of claim 1, wherein negotiating to gain authority over the communication link comprises:

sending a request from the first federation mechanism to the second federation mechanism, wherein the request conveys a proposed policy; and receiving a response from the second federation mechanism.

10. The computer-implemented method of claim 9, wherein the received response includes addendums to the proposed policy, and wherein negotiating to gain authority over the communication link further comprises:

replying to the response with an acceptance of the addendums; and receiving an indication that the second federation mechanism confers delegating authority of the communication link to the first federation mechanism.

11. The computer-implemented method of claim 9, wherein the received response includes acceptance to the proposed policy, and wherein negotiating to gain authority over the communication link further comprises:

receiving a delegation of authority from the second federation mechanism to the first federation mechanism; and transferring authority from the first federation mechanism to an administrator of the first overlay to provision and to enforce the proposed policy upon the communication link.

12. The computer-implemented method of claim 1, wherein delegating authority over the communication link from the second federation mechanism to the first federation mechanism comprises:

delegating authority that regulates policy provision and policy enforcement when the first overlay and the second overlay are provisioned to interoperate.

13. The computer-implemented method of claim 1, wherein delegating authority over the communication link comprises: sending a solicitation to gain delegation of authority from the second
federation mechanism; and
receiving a confirmation from the second federation mechanism agreeing to delegate authority of the communication link to the first federation mechanism.

14. One or more computer storage media devices having computer-executable instructions embodied thereon that, when executed, by one or more processors, causes the one or more processors to perform a method for allowing a first overlay governed by a first authority domain to negotiate with a second overlay governed by a second authority domain in order to avoid addressing ambiguity, the method comprising:
providing the first overlay that includes members assigned virtual IP addresses from a first address range, wherein a first federation mechanism is associated with the first authority domain and is provisioned to negotiate on behalf of the first overlay;
providing the second overlay that includes members assigned virtual IP addresses from a second address range, wherein a second federation mechanism is associated with the second authority domain and is provisioned to negotiate on behalf of the second overlay;
invoking a negotiation between the first federation mechanism and the second federation mechanism, wherein the negotiation includes an address-resolution process that establishes a communication link;
negotiating to gain authority over the communication link; and
delegating authority over the communication link from the second federation mechanism to the first federation mechanism, wherein delegating authority over the communication link comprises the second federation mechanism delegating authority that governs policy provision and policy enforcement over the communication link to a service manager of the first federation mechanism; and
when the first overlay and the second overlay are provisioned to interoperate, the service manager governs both the first federation mechanism of the first overlay and the second federation mechanism of the second overlay.

15. The one or more computer storage media devices of claim 14, wherein the address negotiation process comprises:
(a) determining a version of internet protocol (IP) to employ when routing communications between the first overlay and the second overlay;
(b) when it is determined to employ IP version 6 (IPv6) addressing, establishing a communication link that is absent a translation mechanism;
(c) when it is determined to employ IP version 4 (IPv4) addressing, determining whether a portion of the first address range and a portion of the second address range overlap;
(d) when it is determined that no overlap exists between the first address range and the second address range, establishing the communication link that is absent the translation mechanism; and
(e) when it is determined that the first address range and the second address range overlap, establishing a network address translation (NAT) link that attempts to resolve IPv4 address conflicts between the first overlay and the second overlay.

16. The one or more computer storage media devices of claim 15, wherein establishing the NAT link comprises:
establishing the communication link between the first overlay and the second overlay; and
injecting a translation device into the communication link that functions as an interface for converting overlapping IP addresses.

17. The one or more computer storage media devices of claim 14, wherein negotiating to gain authority over the communication link comprises:
sending a request from the first federation mechanism to the second federation mechanism, wherein the request conveys a proposed policy; and
receiving a response from the second federation mechanism, wherein the received response includes addendums to the proposed policy;
replying, from the first federation mechanism, to the response with an acceptance of the addendums; and
receiving, from the second federation mechanism, an indication that the second federation mechanism confers delegating authority of the communication link to the first federation mechanism.

18. A computer system capable of coordinating between a first authority domain and a second authority domain, the computer system comprising:
a computer storage medium device having computer-executable instructions embodied thereon that, when executed, by one or more processors, causes the one or more processors to perform the computer-executable instructions; the computer-executable instructions comprise:
a fabric controller component configured for:
invoking a negotiation between a first federation mechanism and a second federation mechanism, wherein the negotiation includes an address-resolution process that establishes a communication link, wherein the computer-executable instructions further comprise instructions for causing the first federation mechanism and the second federation mechanism to be configured for:
negotiating to gain authority over the communication link, and delegating authority over the communication link from the second federation mechanism to the first federation mechanism, wherein delegating authority over the communication link comprises:
sending a solicitation to gain delegation of authority from the second federation mechanism;
receiving a confirmation from the second federation mechanism agreeing to delegate authority of the communication link to the first federation mechanism, wherein delegating authority over the communication link from the second federation mechanism to the first federation mechanism, wherein delegating authority over the communication link further comprises the second federation mechanism delegating authority that governs policy provision and policy enforcement over the communication link to a service manager of the first federation mechanism; and when a first overlay and a second overlay are provisioned to interoperate, the service manager governs both the first federation mechanism of the first overlay and the second federation mechanism of the second overlay, wherein the first overlay includes members assigned virtual IP addresses from a first address range, wherein the first federation mechanism is associated with the first authority domain and is provisioned to negotiate on behalf of the first overlay;

wherein the second overlay includes members assigned virtual IP addresses from a second address range, wherein the second federation mechanism is associated with the second authority domain and is provisioned to negotiate on behalf of the second overlay.

19. The computer system of claim 18, wherein negotiating to gain authority over the communication link comprises:

sending a request from the first federation mechanism to the second federation mechanism, wherein the request conveys a proposed policy; and receiving a response from the second federation mechanism, wherein the received response includes addendums to the proposed policy;

replying, from the first federation mechanism, to the response with an acceptance of the addendums; and receiving, from the second federation mechanism, an indication that the second federation mechanism confers delegating authority of the communication link to the first federation mechanism.

* * * * *